United States Patent [19]

Yamada et al.

[11] Patent Number: 5,679,120
[45] Date of Patent: Oct. 21, 1997

[54] GREASE FILTER

[75] Inventors: Akira Yamada, Nabari; Toshihiro Higashino, Osaka; Takashi Takato, Nabari, all of Japan

[73] Assignee: Kuraco Limited, Osaka, Japan

[21] Appl. No.: 515,124

[22] Filed: Aug. 15, 1995

[51] Int. Cl.$^6$ ................................................ B01D 45/08
[52] U.S. Cl. ...................... 55/257.2; 55/440; 55/DIG. 36
[58] Field of Search ........................... 55/257.1, 257.2, 55/440, DIG. 36

[56] References Cited

U.S. PATENT DOCUMENTS

| | | | |
|---|---|---|---|
| 1,926,924 | 9/1933 | Sylvan | 55/440 |
| 2,753,164 | 7/1956 | Miller | 55/440 X |
| 2,760,597 | 8/1956 | Brixius | 55/440 |
| 3,248,858 | 5/1966 | Toke | 55/257.2 X |
| 3,433,146 | 3/1969 | Russell | 55/DIG. 36 |
| 4,175,938 | 11/1979 | Regehr et al. | 55/440 |
| 4,204,847 | 5/1980 | Ko | 55/257.2 |
| 4,557,740 | 12/1985 | Smith | 55/440 |
| 5,300,131 | 4/1994 | Richard | 55/257.2 X |

FOREIGN PATENT DOCUMENTS

| | | |
|---|---|---|
| 50-82207 | 6/1975 | Japan . |
| 60-68023 | 4/1985 | Japan . |
| 64-75022 | 3/1989 | Japan . |

Primary Examiner—Richard L. Chiesa
Attorney, Agent, or Firm—Nikaido Marmelstein Murray & Oram LLP

[57] ABSTRACT

A grease filter capable of separating the oil particles at an increased efficiency only with the use of a fan of small capacity. The grease filter includes a frame supporting a plurality of baffles spaced in a row. Each baffle has a generally V-shaped cross-section with first and second walls which merge into a bent. The grease filter is arranged to have the bents opposed to each other and to locate the first and second walls, respectively on upstream and downstream sides of the filter, thereby forming upstream passages between the first walls of the adjacent baffles and forming downstream passages between the second walls of the adjacent baffles. The baffles are configured such that the upstream passage has a width which is narrower towards a downstream end of the upstream passage than at an upstream end of the upstream passage, and that the downstream passage has a width which is greater than the width of the upstream passage at the downstream end thereof. Thus, the oil mist drawn into the filter is caused to increase the flow velocity as it is directed through the upstream passage and rush into the downstream passage at a desired maximum flow velocity past the bents. The oil mist thus entering the downstream passages is caused to change its flow direction, whereby the oil particles are deposited on the second walls by the effect of collision of the oil mist against the second wall and further by a centrifugal force generated by the change of the flow direction.

4 Claims, 3 Drawing Sheets

GREASE FILTER

BACKGROUND OF THE INVENTION

1. Field of the Invention

The present invention is directed to a grease filter, and more particularly to such grease filter having baffles and adapted to be used in a kitchen ventilating system for removing oil particles from an oil mist occurring at kitchen cooking.

2. Description of the Prior Art

Grease filters with baffles are utilized in the art to remove airborne oil particles from the oil mist or the like. The baffles are arranged in the filter to define therebetween curved passages through which the oil mist is forced to flow so that the oil mist experience a sharp turn in the passage. The sharp turn gives a centrifugal force by which the airborne oil particles are forced to collide with the baffle to be thereby deposited thereon as being separated from the oil mist. In order to enhance separation efficiency of the oil particles, it is believed to narrow the passage for increasing the flow rate as well as to increase the number of the bents in the passage with resulting increase in flow resistance. However, it is found that the separation efficiency for the oil mist may not be doubled even when the number of the bents is doubled at the same flow velocity. In the field of separation of airborne particles, there has been known an established theory with respect to a relation between the size of the particles to be separated and flow velocity. The relation is affirmed by the use of the Andersen Particle Fractionating Sampler in which the airborne particles are fractionated by collision against baffles at different flow velocities to measure size distribution of airborne particles. For the oil mist generated at a temperature of 250° to 270°, a cooking condition in an average kitchen, it is experimentally revealed that the oil mist includes approximately 80% of the oil particles having a size of 3.0µ or more. In order to collect the oil particles of that size by the use of the baffles, the oil mist is required to give a flow velocity of 5.27 m/sec on the basis of the established theory with the Andersen Particle Fractionating Sampler. Consequently, improving the separation efficiency of the oil particles by increasing the flow resistance in the above grease filter necessitates a fan of a large capacity to maintain the required flow velocity.

SUMMARY OF THE INVENTION

The present invention has been accomplished in view of the above and to provide a grease filter which is capable of separating the oil particles at an increased efficiency only with the use of a fan of small capacity. The grease filter in accordance with the present invention comprises a frame supporting a plurality of baffles in a row. The baffles are spaced to define therebetween air passages through which an air carrying the oil particles are directed. Each of the baffles has a generally V-shaped cross-section with a first wall and a second wall which merge into a bent. The grease filter is arranged in the frame in such a manner as to have the bents opposed to each other and locate the first wall on an upstream side of the filter and the second wall on an downstream side of the filter, thereby forming upstream passages between the first walls of the adjacent baffles and forming downstream passages between the second walls of the adjacent baffles. The baffles are configured such that the upstream passage has a width which is narrower towards a downstream end of the upstream passage than at an upstream end of the upstream passage, and that the downstream passage has a width which is greater than the width of the upstream passage at the downstream end thereof. Thus, the oil mist drawn into the filter is caused to increase the flow velocity as it is directed through the upstream passage and rush into the downstream passage at a desired maximum flow velocity past the bents. The oil mist thus entering the downstream passages is caused to change its flow direction, whereby the oil particles are deposited on the second walls by the effect of collision of the oil mist against the second wall and further by a centrifugal force generated by the change of the flow direction. The air thus removed of the oil particles are directed to flow outwardly of the downstream passages. Thus, the oil mist reaches its maximum velocity until it enters the downstream passages and is directed outwardly through the downstream passage without suffering from increased flow resistance.

Accordingly, it is a primary object of the invention to provide a grease filter which is capable of increasing efficiency of removing the oil particles without resorting to a fan of large flow rate capacity which is inherently bulky and heavy.

Preferably, the first wall is curved to form a concave with respect to an incoming flow direction so that the air is directed smoothly at a less flow resistance through the upstream passage to increase the flow velocity up to the desired maximum level with a fan of less capacity.

The second wall is formed as a straight member to give the downstream passage of a uniform width, thereby reducing the flow resistance of the air while directed through the downstream passage and therefore reducing the power requirement to the associated fan.

An entrance fin may be added to extend from an upstream end of each first wall in a generally parallel relation to the incoming flow direction and in an angled relation to the first wall member so as to define between the entrance fins of the adjacent baffles an entrance passage angled with respect to the upstream passage. With the provision of the entrance passage, the air introduced through the entrance passage is caused to firstly collide with the first wall member of the upstream passage, thereby preliminary depositing the oil particles on the first wall prior to reaching the downstream passage and therefore enhancing separation efficiency of removing the oil particles.

These and still other objects and advantageous features will become more apparent from the following description of the preferred embodiments when taken in conjunction with the attached drawings.

DESCRIPTION OF THE EMBODIMENTS

Figure 1:
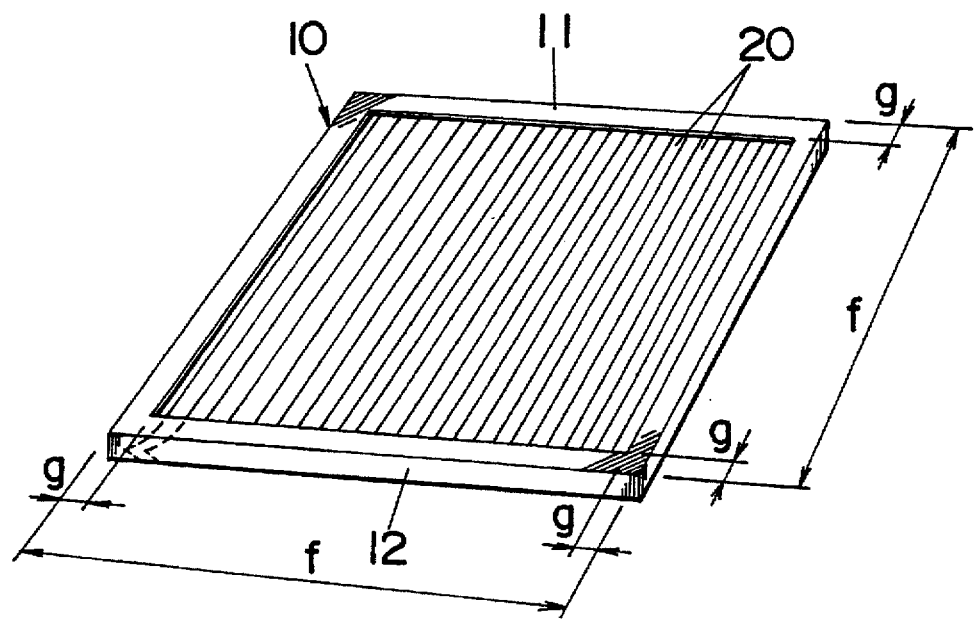
FIG. 1 is a perspective view of a grease filter in accordance with a first embodiment of the present invention.
Figure 2:
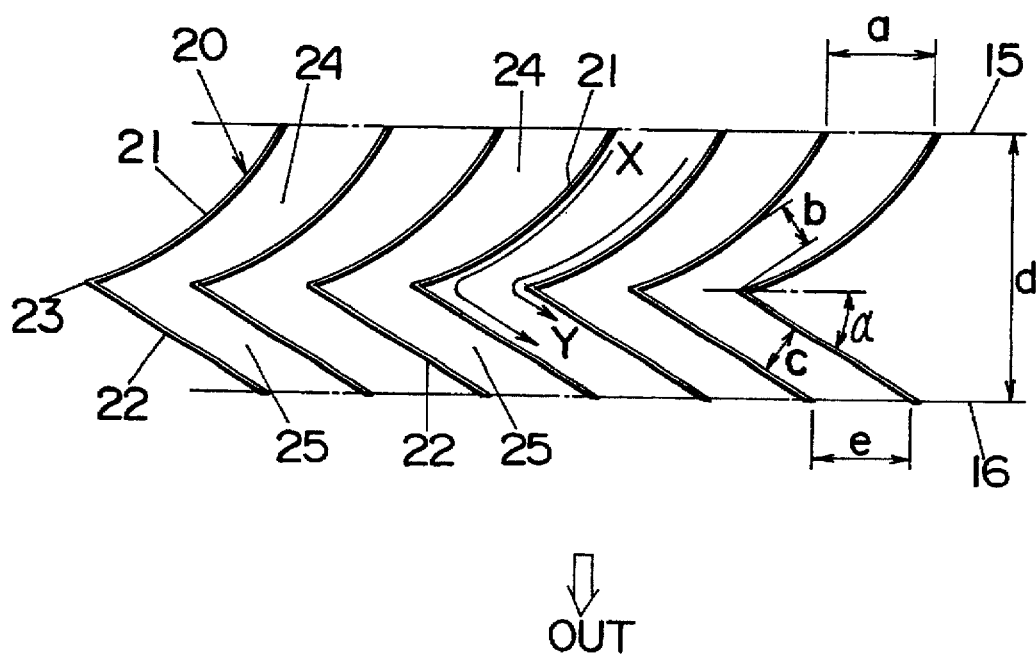
FIG. 2 is a sectional view of a portion of the grease filter.

Referring to FIG. 1, a grease filter in accordance with a preferred embodiment of the present invention comprises a rectangular frame 10 and a plurality of baffles 20 which are arranged in a row within the frame 10 and held between upper and lower members 11 and 12 of the frame 10. The filter is mounted in a kitchen ventilation system to pass a forced flow of the air caused by a fan (not shown) for removing the airborne oil particles from the air flow, sometimes referred to as a flow of an oil mist. As shown in FIG. 2, each of the baffles 20 is made from a thin metal sheet to have a generally V-shaped cross-section with a first wall 21 and a second wall 22 which merge into a sharp bent 23. The baffles 20 are evenly spaced in the frame 10 in such a manner to align the bents 23 and form passages between the adjacent baffles 20 for directing the flow of the oil mist. The first walls 21 of the baffles 20 are disposed on the upstream side of the filter in such a manner as to align upstream ends of the first wall in a front open plane 15 of the filter. Likewise, the second walls 22 are disposed to have their downstream ends aligned in a rear open plane 16 of the filter. Thus, the first walls 21 of the adjacent baffles 20 define therebetween upstream passages 24 inclined with respect to the front plane 15. Likewise, the second walls 22 of the adjacent baffles 20 define therebetween downstream passages 25 inclined with respect to the rear plane 16 at an angle $\alpha$ of about 30° as well as to the associated upstream passages 24 at a general angle of $2\alpha$. Each of the baffles 20 is configured such that the width of the upstream passage 24 is narrower toward the bent 23 than at the upstream end for gradually narrowing cross-section of the upstream passage 24 towards the bent 23. That is, the upstream passage 24 has a maximum width (a) at the upstream end and a minimum width (b) immediately adjacent the bent 23, as indicated in FIG. 2. Further, the second wall 22 of the baffle 20 is formed as a straight member such that the downstream passage 25 has a constant width (c) except at the downstream end thereof where the downstream end has an exit width of (e) greater than width (c). The width (c) is selected to be grater than minimum width (b) of the upstream passage 24. The first wall 21 of the baffle 20 is continuously curved to form a convex with respect to the incoming flow direction (IN) to reduce flow resistance of the air directed through the upstream passage, thereby smoothly increasing the flow velocity of the air until the air flows past the bent 23. After reaching the maximum flow velocity, the air is directed to the downstream passage 25 to collide against the second wall 22 adjacent the bent 23 and is caused to change the flow direction sharply, whereby the oil particles carried on the air are deposited on the second wall 22 as being coagulated by the direct collision against the second wall and by a centrifugal effect of flying the oil particles against the second wall due to a centrifugal force generated by the change of the flow direction. The air thus removed of the oil particles are directed to flow outwardly of the downstream passages in the direction (OUT) as indicated in the figure. Since the downstream passage 25 is formed as a straight channel having a uniform width (c) substantially along its length, the flow resistance in the downstream passage 25 is minimum so that the required maximum flow velocity at the end of the upstream passage 24 can be attained with the fan of less capacity. It is noted in this connection that the air flows at a greater velocity through a course indicated by an arrow (x) than through a course (y), providing a negative pressure on the side of the course (x) to thereby draw the oil particles towards the negative pressure side and increase concentration of the oil particles on this side. The oil particles thus concentrated on the negative pressure side are deposited on the adjacent second wall 22.

Figure 3:
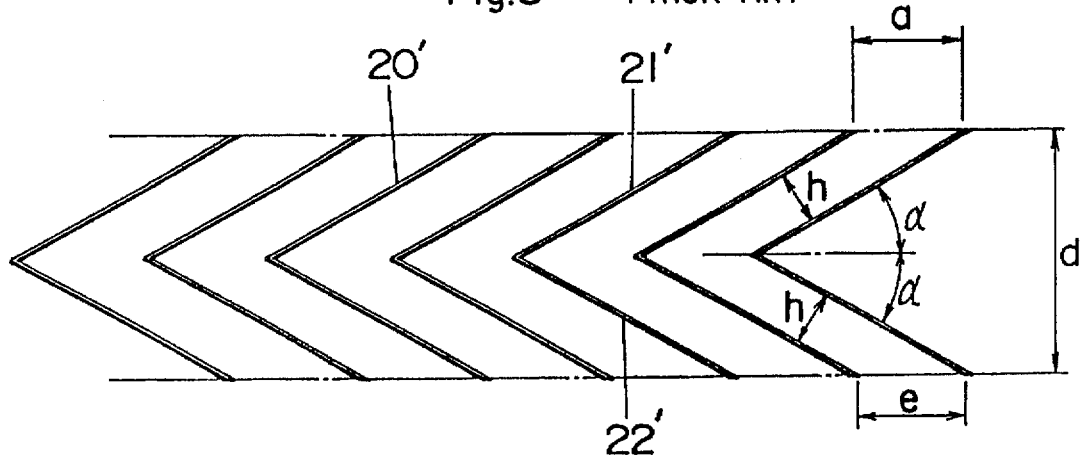
FIG. 3 is a sectional view similar to FIG. 2 but illustrating a reference grease filter tested in comparison with the grease filter of FIG. 1.

In order to demonstrate superior separation efficiency of the grease filter in accordance with the present invention, a test was made to measure the separation efficiency for the grease filter of the present invention and for a reference grease filter in which, as shown in FIG. 3, baffles 20' of V-shaped cross-section are evenly spaced. The baffle 20' comprises straight first and second walls 21' and 22' of symmetrical configuration to give upstream passages 24' and downstream passage 25' of the same width (h). The grease filter of the present invention is configured to have the following dimensions for the portions as indicated in FIGS. 1 and 2.

| overall filter configuration | length and width (f) | 500 mm |
| | frame margin (g) | 20 mm |
| | thickness (d) | 20 mm |
| upstream passage 24 | front opening width (a) (maximum width) | 10 mm |
| | minimum width (b) | 4 mm |
| first wall 21 | radius of curvature (R) | 30 mm |
| downstream passage 25 | width (c) | 5 mm |
| | rear opening width (e) | 10 mm |
| | bent angle $\alpha$ | 30° |

The reference grease filter is configured to have the following dimensions for the corresponding portions.

| overall filter configuration | length and width (f) | 500 mm |
| | frame margin (g) | 20 mm |
| | thickness (d) | 20 mm |
| upstream passage 24 | front opening width (a) | 10 mm |
| | width (h) | 5 mm |
| downstream passage 25 | width (h) | 5 mm |
| | rear opening width (e) | 10 mm |
| | bent angle $\alpha$ | 30° |

The above two filters were tested for the oil mist carrying oil particles of a size of 3.0μ or more, under conditions of static pressure of 2.0 mmAq, flow volume of 16.5 m³/m and set to have a maximum flow velocity of 5.27 m/sec necessary for separating the oil particles having a particle size of 3.0μ or more. The results are that 80.5% of the oil particles having the size of 3.0μ or more are separated by the grease filter of the present invention, while only 62.0% of the oil particles of the size 3.0μ or more are separated by the reference grease filter. Thus, the grease filter of the present invention has superior separation efficiency even with low static pressure as less as 2.0 mmAq.

Figure 4:
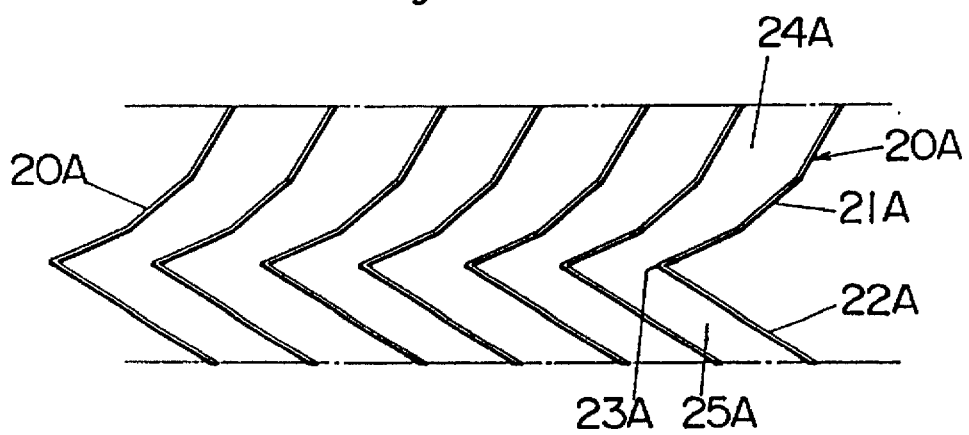
FIGS. 4 and 5 are sectional views which are similar to FIG. 2, but illustrate modifications of the grease filter, respectively.

FIG. 4 illustrate a modification of the above embodiment which is identical to the above embodiment except that the first wall 21A of the baffle 20A is curved stepwise to form a like concave. Like parts are designated by like numerals with a suffix letter of "A".

Figure 5:
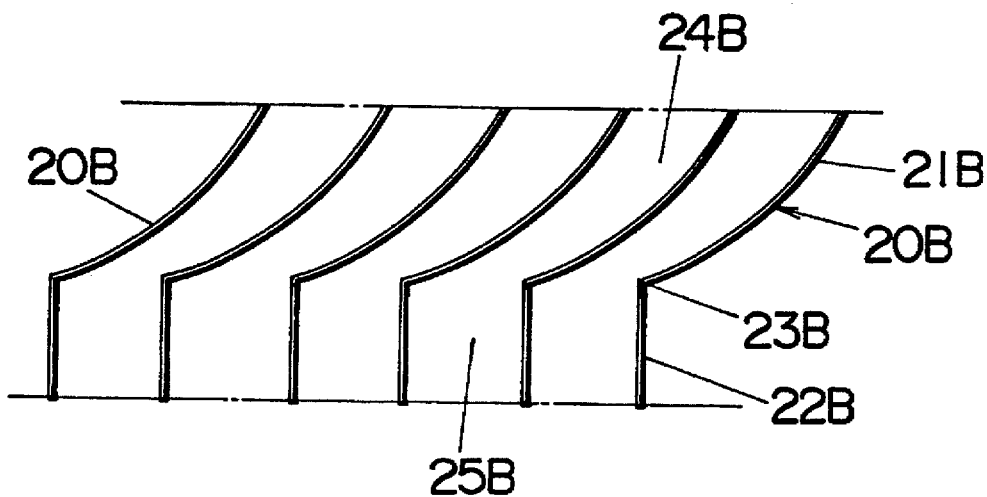

FIG. 5 illustrates another modification of the above embodiment which is identical to the above embodiment except that the second wall 22B of the baffle 20B extends straight to form the downstream passage 25B perpendicular to the rear plane of the filter. This arrangement minimizes the flow resistance at the down stream passage and therefore enables to attain the desired maximum flow velocity at the end of the upstream passage 24B necessary for separating the oil particles with the use of a fan of less capacity. Like parts are designated by like numerals with a suffix letter of "B".

Figure 6:
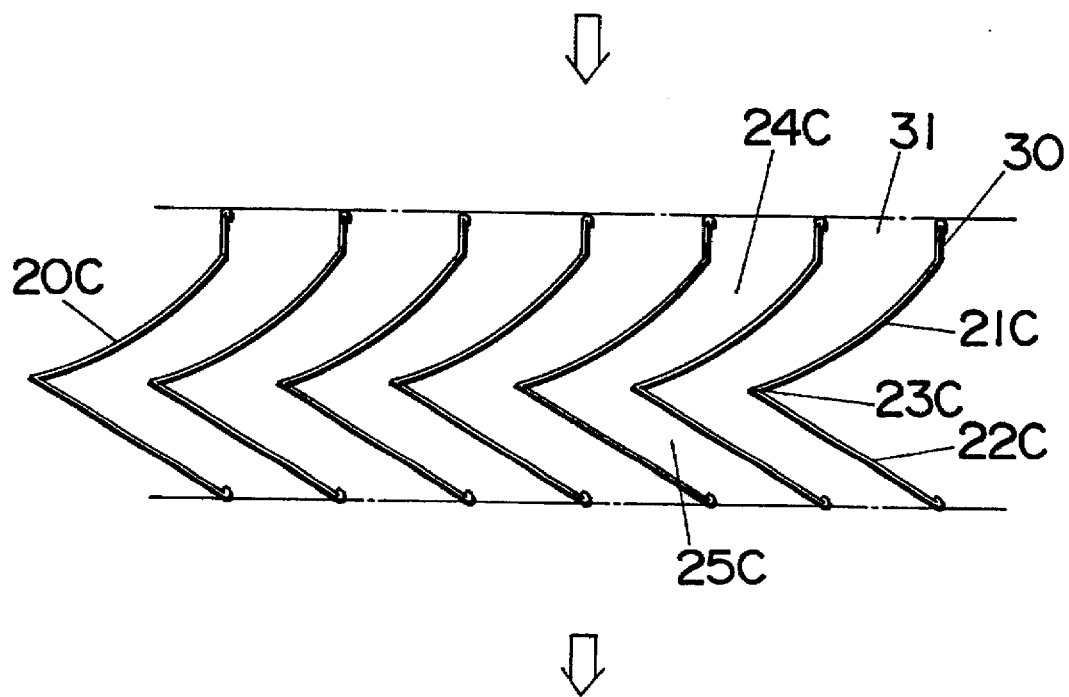
FIG. 6 is a sectional view similar to FIG. 2 but illustrating a grease filter in accordance with a second embodiment of the present invention.

FIG. 6 illustrates a grease filter in accordance with a second embodiment of the present invention which is identical to the first embodiment except that an entrance fin 30 extends from the front end of each first wall 21C. Like parts are designated by like numerals with a suffix letter of "C". The entrance fin 30 is formed from the metal sheet as an integral part of the baffle 20C to extend perpendicular to the front plane of the filter so as to define between the adjacent entrance fins an entrance passage 31 which is in parallel with the incoming flow direction and is angled with respect to the upstream passage 24C. In this embodiment, the oil mist drawn into the filter through the entrance passage 31 is firstly caused to collide with the first wall 21C to have some of the oil particles deposited thereon, after which the oil mist is directed through the upstream passage 24C at an increasing flow velocity and enter the downstream passage 25C at the maximum flow velocity. Whereby, the remaining oil particles are deposited on the second walls 22C in the manner as described with reference to the first embodiment. The edges of the baffle 20C is rounded by being folded. Such rounded edges are equally applicable to the other embodiment and the modifications.

What is claimed is:

1. A grease filter for removing airborne oil particles, said filter comprising:

a frame supporting a plurality of baffles in a row;

said baffles being spaced to define therebetween air passages through which an air carrying the oil particles are directed;

each of said baffles having a substantially V-shaped cross-section with a first wall and a second wall which merge into a bent;

said baffles being arranged in said frame to have said bents opposed to each other and locate said first wall on an upstream side of said filter and said second wall on a downstream side of said filter so as to form upstream passages between the first walls of the adjacent baffles and to form downstream passages between the second walls of the adjacent baffles, wherein the second walls are parallel to each other;

said baffle being configured such that said upstream passage has a width which is narrower adjacent a downstream end of said upstream passage than at an upstream end of said upstream passage, wherein the width of said upstream passage incrementally narrows toward the downstream end of said upstream passage, and that said downstream passage has a constant width defined by said second walls which is greater than the width of said upstream passage at said downstream end thereof.

2. A grease filter as set forth in claim 1, wherein said first wall forms a concave with respect to an incoming flow direction.

3. A grease filter as set forth in claim 2, wherein said second wall is a straight member so as to make said downstream passage of a uniform width along substantially the entire length thereof.

4. A grease filter as set forth in claim 1, wherein an entrance fin extends from an upstream end of each said first wall in a substantially parallel relation to the incoming flow direction and in an angled relation to the first wall member so as to define between said entrance fins of the adjacent baffles an entrance passage angled with respect to said upstream passage.

* * * * *